United States Patent
Shyu et al.

(10) Patent No.: US 7,892,996 B2
(45) Date of Patent: Feb. 22, 2011

(54) LEAD-FREE SEALING MATERIAL

(75) Inventors: Jiin-Jyh Shyu, Taipei (TW);
Chih-Hsien Yeh, Taipei (TW)

(73) Assignees: Tatung Company, Taipei (TW); Tatung University, Taipei (TW)

( * ) Notice: Subject to any disclaimer, the term of this patent is extended or adjusted under 35 U.S.C. 154(b) by 185 days.

(21) Appl. No.: 12/165,628

(22) Filed: Jun. 30, 2008

(65) Prior Publication Data

US 2009/0291822 A1    Nov. 26, 2009

(30) Foreign Application Priority Data

May 20, 2008    (TW) ............................... 97118558 A

(51) Int. Cl.
*C03C 8/24*    (2006.01)
*C03C 3/16*    (2006.01)
*C03C 3/19*    (2006.01)

(52) U.S. Cl. ............................. 501/15; 501/17; 501/45; 501/47

(58) Field of Classification Search ................... 501/15, 501/17, 45, 47
See application file for complete search history.

(56) References Cited

U.S. PATENT DOCUMENTS 5,514,629 A * 5/1996 Morena ........................ 501/15
6,306,783 B1 * 10/2001 Yamanaka ................... 501/15

FOREIGN PATENT DOCUMENTS

| JP | 2001010843 | * | 1/2001 |
| JP | 2001064524 | * | 3/2001 |
| JP | 2004010405 | * | 1/2004 |

OTHER PUBLICATIONS

Machine translation of JP 2004010405, Jan. 15, 2004.*

* cited by examiner

*Primary Examiner*—Karl E Group
(74) *Attorney, Agent, or Firm*—Jianq Chyun IP Office

(57) ABSTRACT

A lead-free sealing material is provided, which contains a glass with a composition including 47.5-67.5 mole % SnO, 2.5-15 mole % MgO, and 30-40 mole % $P_2O_5$. The lead-free sealing material has excellent chemical durability, low melting temperature, and good flowability during heating. The lead-free material is particularly suitable to be used as a sealing material. The lead-free sealing material may additionally contain low-thermal-expansion powdered fillers to reduce the thermal expansion coefficient of the resulting sealing material.

9 Claims, 1 Drawing Sheet

US 7,892,996 B2

LEAD-FREE SEALING MATERIAL

CROSS-REFERENCE TO RELATED APPLICATION

This application claims the priority benefit of Taiwan application serial no. 97118558, filed on May 20, 2008. The entirety of the above-mentioned patent application is hereby incorporated by reference herein and made a part of this specification.

BACKGROUND OF THE INVENTION

1. Field of the Invention

The present invention generally relates to a sealing material, in particular, to a lead-free sealing material.

2. Description of Related Art

Low-temperature sealing glass materials have been used in display, microelectronics, semiconductor, and other fields to bond the elements, for example, for the glass-to-glass, glass-to-metal, glass-to-ceramics, ceramics-to-ceramics, and metal-to-ceramics bond.

The characteristics of the low-temperature sealing glass materials are as follows.

1. The glass softening temperature must be low enough (usually lower than 500° C.), so as to prevent the element to be bonded from being damaged during the bonding process, as the element is not high temperature resistant.

2. The thermal expansion coefficients of the glass and the element to be bonded must be as close to each other as possible, so as to prevent the structural twisting deformation or function loss due to an internal stress generated during a cooling process after the bonding process.

3. The viscosity of the glass must be appropriate, and the glass and the element to be bonded have a good wettability during the bonding process.

4. The glass has good chemical durability and weather resistance.

5. The glass should not react with the element to be bonded significantly during the bonding process, so as to prevent the element from being damaged.

Previously, most of the composition of the low-temperature sealing glass contains a great amount of lead, but lead and the compound thereof are hypertoxic and are difficult to be decomposed, and thus being extremely harmful to human body and environment. From July of 2006, European Union began to comprehensively implement "Restriction on the Use of Hazardous Substances (RoHS)", in which materials containing lead, cadmium, mercury, and hexavalent chromium ($Cr^{6+}$) are not permitted to be applied to any electronic products, and the entry of the lead containing solder products to the European Union will be completely prohibited in 2008. Therefore, under the situation that the environmental protection consciousness is increasing, and in order to satisfy the environmental protection regulations of the European Union, it is extremely important to develop a new lead-free sealing glass material with a low melting temperature.

Recently, although the lead-free sealing glass material of $V_2O_3$—ZnO—BaO—$P_2O_5$ or $Bi_2O_3$—$SiO_2$—$B_2O_3$ system is free of lead, the glass softening temperature is quite high, so it is not used in the low-temperature field. Further, CuO—$P_2O_5$ system is also used, and alkali metals and alkali earth oxides are added to prepare the lead-free sealing glass with the low melting temperature, in which the glass transition temperature is approximately 400-500° C. However, the alkali metals and the copper ion may affect the semiconductor function, so it may have problems in application.

SUMMARY OF THE INVENTION

Accordingly, the present invention is directed to a lead-free sealing material, capable of replacing the lead based glass, and having low melting temperature, flowability during heating, and excellent chemical durability.

The present invention provides a lead-free sealing material, which contains a glass with a composition including 47.5-67.5 mole % SnO, 2.5-15 mole % MgO, and 30-40 mole % $P_2O_5$.

In an embodiment of the present invention, the glass further contains 0-6 mole % $B_2O_3$.

Hereinafter, the proportion and the function of each composition of the glass of the lead-free sealing material are illustrated.

The content of $P_2O_5$ affects the formation of the glass and also affects the chemical durability of the glass. The content of $P_2O_5$ is preferably 30-40 mole %. If the content of $P_2O_5$ is lower than 30 mole %, the glass forming capability is weak. If the content of $P_2O_5$ is higher than 40 mole %, although it is easier to form the glass, the chemical durability becomes poor. In addition, $P_2O_5$ also provides the source of the glass crystallization composition, which is helpful to improve the chemical durability of the sealing material.

The optimal content of MgO is between 2.5 and 15 mole %. If the content of MgO is higher than 15 mole %, the melting temperature of the glass may be increased, and the flowability of the glass during the sealing heat processing becomes poor. In addition, MgO and $P_2O_5$ generate a crystallization phase, so as to improve the chemical durability function of the sealing material.

SnO has the function of reducing the glass softening temperature and providing the good chemical durability. The optimal content of SnO is between 47.5 and 67.5 mole %. If the content of SnO is lower than 47.5 mole %, the chemical durability of the glass is poor.

$B_2O_3$ has the function of delaying the glass crystallization, which is helpful to densify the powdered glass during the sealing process. $B_2O_3$ has another function of improving the chemical durability of the sealing material. The optimal content of $B_2O_3$ is between 0 and 6 mole %.

In an embodiment of the present invention, the content of $P_2O_5$ is 30-37.5 mole %.

In an embodiment of the present invention, the glass softening temperature of the lead-free sealing material is between 335° C. and 515° C.

In an embodiment of the present invention, the lead-free sealing material is used to bond different kinds of materials.

In an embodiment of the present invention, the lead-free sealing material is used to bond the different kinds of materials selected from glass, metal, and ceramics.

In an embodiment of the present invention, the lead-free sealing material is used to seal a package which is high vacuum inside.

In an embodiment of the present invention, the lead-free sealing material is powdered, and a particle size (diameter) is, for example, between 37 and 44 μm.

In an embodiment of the present invention, the lead-free sealing material further includes a low-thermal-expansion powdered filler, capable of reducing a thermal expansion coefficient of the lead-free sealing material, and the powdered filler is, for example, a pyrophosphate $(Co_{0.5}Mg_{0.5})_2P_2O_7$.

In the present invention, SnO—MgO—$P_2O_5$ having a specific mole percentage is used as the glass composition in the lead-free sealing material. SnO—MgO—P$_2$O$_5$ has a low processing temperature and a wide temperature scope for implementing sealing process, and has excellent flowability and chemical durability, so it may replace the lead based sealing glass material.

BRIEF DESCRIPTION OF THE DRAWINGS

The accompanying drawing is included to provide a further understanding of the invention, and is incorporated in and constitutes a part of this specification. The drawing illustrates embodiment of the invention and, together with the description, serve to explain the principles of the invention.

DESCRIPTION OF THE EMBODIMENTS

Figure 1:
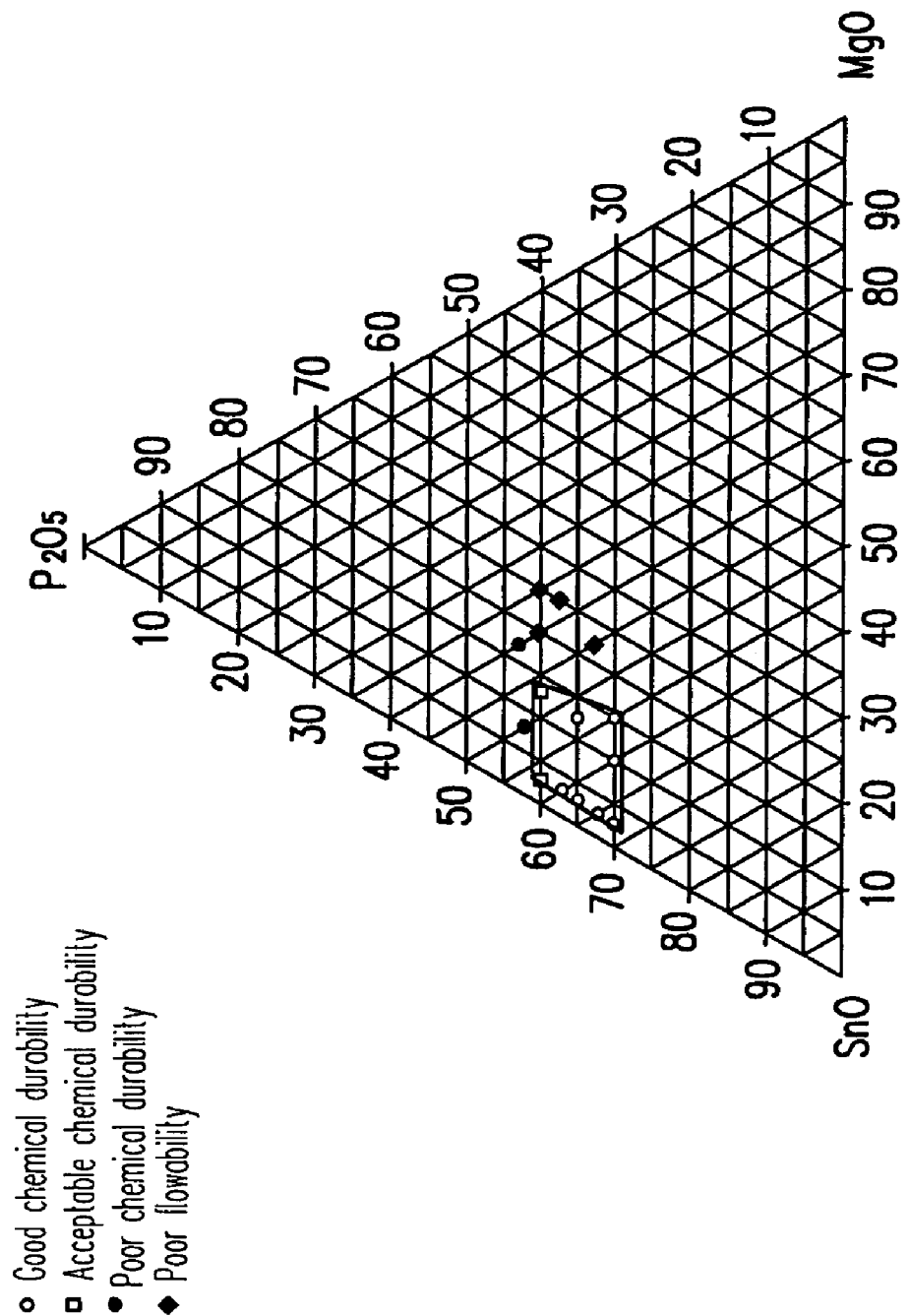
FIG. 1 is a triangle state diagram showing compositions, chemical durability, and flowability of lead-free sealing glass materials fabricated through Experimental Examples 1-15, in which the unit is mole %.

Reference will now be made in detail to the present preferred embodiments of the invention, examples of which are illustrated in the accompanying drawings. Wherever possible, the same reference numbers are used in the drawings and the description to refer to the same or like parts.

The lead-free sealing material of the present invention is a glass with a composition including 47.5-67.5 mole % SnO, 2.5-15 mole % MgO, and 30-40 mole % P$_2$O$_5$. In addition, the glass in the lead-free sealing material of the present invention can further includes 0-6 mole % B$_2$O$_3$.

When the lead-free sealing material of the present invention is powdered, the particle size (diameter) is, for example, between 37-44 μm. The glass softening temperature of the lead-free sealing material of the present invention is, for example, between 335° C. and 515° C.

In addition, the lead-free sealing material of the present invention can further contain one or more powdered fillers, so as to control the crystallinity during the sealing process and to improve the thermal expansion of the lead-free sealing material. The powdered fillers are, for example, alumina powder, β-spodumene, β-quartz solid solution, β-eucryptite, and pyrophosphate ceramics (such as (Co$_{0.5}$Mg$_{0.5}$)$_2$P$_2$O$_7$).

Therefore, the lead-free sealing material of the present invention can be used to bond elements, for example, to bond the same kind or different kinds of materials selected from glass, metal, and ceramics, such as glass-to-glass, glass-to-metal, glass-to-ceramics, metal-to-ceramics, ceramics-to-ceramics and so on. In addition, the lead-free sealing glass material of the present invention can also be used to seal a package which is high vacuum inside.

Hereinafter, a group of experiments is given to prove the effect of the lead-free sealing material of the present invention.

EXPERIMENT 1

(I) Preparation of SnO—MgO—P$_2$O$_5$ Lead-Free Sealing Glass Material

Reagent level powdered Sn$_2$P$_2$O$_7$ and MgO were used as starting materials with the mole percentage in Table 1 (Experimental Examples 1-15), and approximately 1 wt % powdered sugar was added and mixed. Then, the mixture was put into an alumina crucible, and directly put into a melting furnace in nitrogen atmosphere for being homogenized. Thereafter, the glass liquid was poured into water for being quenched, to get frits. The frits were crushed, ball-milled, and sieved to get a powdered glass with a particle size (diameter) of approximately 37-44 μm.

TABLE 1

| | | Experimental Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Glass | SnO | 67.5 | 60 | 55 | 65 | 62.5 | 52.5 | 60 | 57.5 | 47.5 | 50 | 40 | 45 | 37.5 | 40 | 35 |
| Composition | MgO | 2.5 | 10 | 15 | 2.5 | 2.5 | 12.5 | 2.5 | 40 | 12.5 | 7.5 | 17.5 | 22.5 | 25 | 20 | 25 |
| (Mole %) | P$_2$O$_5$ | 30 | 30 | 30 | 32.5 | 35 | 35 | 37.5 | 40 | 40 | 42.5 | 42.5 | 32.5 | 37.5 | 40 | 40 |
| Flowability | | Good | Good | Good | Good | Good | Good | Good | Good | Good | Good | Good | Poor | Poor | Poor | Poor |
| Heat Processing Temperature (° C.) | | 350-500 | 380-500 | 515 | 335-380 | 380-515 | 395-515 | 395-515 | 365-470 | 425-470 | 350-470 | 440-515 | — | — | — | — |
| Chemical Durability | | Good | Good | Good | Good | Good | Good | Good | Acceptable | Acceptable | Poor | Poor | — | — | — | — |

(II) Analysis and Measurement

1. The glass powder was uniaxially pressed in a steel die to yield disc-shaped samples (diameter 5 mm and thickness 3.5 mm). The green body was placed on a slide glass, and subjected to a 335-515° C. sintering heat processing.

2. Chemical Durability

The sintered sample was ultrasonically cleaned with acetone and dried. Then, is the sample was immersed in 100 ml deionized water at 90° C. and was tested for 360 min at an oscillation rate of 100 rpm, and then the corrosion situation of the sample after being tested was observed.

3. Flowability

The diameter of the wet part between the sintered sample and the slide glass was observed to judge whether the flowability is good or not.

FIG. 1 is a triangle state diagram showing compositions, chemical durability, and flowability of lead-free sealing glass materials fabricated through the experiments (Experimental Examples 1-15), in which the unit is mole %.

Referring to FIG. 1, ♦ refers to no wet phenomenon between the lead-free sealing material after the heat processing and the slide glass (the lead-free sealing material is not softened), and represents the poor flowability of the lead-free sealing material. ○, □, and ● refer to distinct wet phenomenon between the lead-free sealing material after heat processing and the slide glass, and bright appearance of the lead-free sealing material. ○ refers to that after the chemical durability test, the appearance of the lead-free sealing material is the same as the sample before being tested, and represents that the chemical durability of the lead-free sealing material is good. □ refers to that after the chemical durability test, the appearance of the lead-free sealing material becomes white because of some microcorrosion product, but the surface of the sample is bright, and represents that the chemical durability of the lead-free sealing material is acceptable. ● refers to that after being corroded, the appearance of the lead-free sealing material becomes white and is not bright because of the corrosion product, and represents that the chemical durability of the lead-free sealing material is poor. The test results of FIG. 1 are listed in Table 1, and it can be known that the lead-free sealing glass materials of the Experimental Examples 1-9 satisfy the demands of good flowability and chemical durability. Particularly, when the content of $P_2O_5$ is between 30 mole % and 37.5 mole %, a preferred flowability is obtained.

EXPERIMENT 2

In addition, in the present invention, the glass composition of the Experimental Example 1 was further selected, and 0-6 mole % $B_2O_3$ was added as a composition additive, for example the Experimental Example 16 of Table 2. The result shows that the lead-free sealing glass material has good flowability and chemical durability.

In the Experimental Example 17, the glass material of the Experimental Example 2 was selected, and 10 vol % $(Co_{0.5}Mg_{0.5})_2P_2O_7$ was added as the powdered filler. in addition to acceptable flowability during the sealing heat processing, the sealing material is tested to have a thermal expansion coefficient reduced from $120\times10^{-7}/K$ to $81\times10^{-7}/K$ (after the heat processing, which indicates that to the thermal expansion coefficient of the sealing material can be effectively reduced.

TABLE 2

|  |  | Experimental Example | |
| --- | --- | --- | --- |
|  |  | 16 | 17 |
| Glass Composition | SnO | 60 | 60 |
| (Mole %) | MgO | 10 | 10 |
|  | $P_2O_5$ | 30 | 30 |
|  | $B_2O_3$ | 0-6 | — |
| $(Co_{0.5}Mg_{0.5})_2P_2O_7$ |  | — | 10 vol % |
| Flowability |  | Good | Acceptable |
| Thermal Expansion Coefficient ($\times 10^{-7}/K$) |  | — | 81 |
| Chemical Durability |  | Good | Good |

In view of the above, in the present invention, SnO—MgO—$P_2O_5$ having a mole percentage in a specific range is used as the glass composition, such that the sealing material has the low processing temperature, the excellent flowability, and the chemical durability, and so on, so the lead-free sealing material can replace the lead based sealing glass material, and is applied to bulbs, cathode ray tubes, flat panel display, heads for data recording, and semiconductors which are relatively not high temperature resistant, electronic ceramic elements, SiC or AlN encapsulation, and other fields.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lead-free sealing material, comprising:
   a glass with a composition comprising 47.5-67.5 mole % SnO, 2.5-15 mole % MgO, 30-40 mole % $P_2O_5$; and
   a low-thermal-expansion powdered filler, capable of reducing a thermal expansion coefficient of the lead-free sealing material, wherein the powdered filler comprises a pyrophosphate $(Co_{0.5}Mg_{0.5})_2P_2O_7$.

2. The lead-free sealing material according to claim 1, wherein a content of $P_2O_5$ is 30-37.5 mole %.

3. The lead-free sealing material according to claim 1, wherein the lead-free sealing material is powdered.

4. The lead-free sealing material according to claim 3, wherein a particle size of the lead-free sealing material is between 37 μm and 44 μm.

5. The lead-free sealing material according to claim 1, wherein a glass softening temperature of the lead-free sealing material is between 335° C. and 515° C.

6. The lead-free sealing material according to claim 1, wherein the lead-free sealing material is used to bond different kinds of materials.

7. The lead-free sealing material according to claim 1, wherein the lead-free sealing material is used to bond the same kind or different kinds of materials selected from glass, metal, and ceramics.

8. The lead-free sealing material according to claim 1, wherein the lead-free sealing material is used to seal a package which is high vacuum inside.

9. The lead-free sealing material according to claim 1, wherein the glass further comprises 0-6 mole % $B_2O_3$.

* * * * *